United States Patent [19]

Kusz

[11] 4,367,829
[45] Jan. 11, 1983

[54] UNIT FOR CARRYING CARGO AND/OR CHILD

[76] Inventor: John P. Kusz, 5536 N. Monitor, Chicago, Ill. 60630

[21] Appl. No.: 225,706

[22] Filed: Jan. 16, 1981

[51] Int. Cl.³ .............................. B62J 1/28; B62J 9/00
[52] U.S. Cl. .................................. 224/31; 224/32 A; 280/202; 280/289 A; 297/217; 297/243; 297/DIG. 9
[58] Field of Search .......................... 280/289 A, 202; 224/32 A, 32 R, 42.01, 31, 30 R, 30 A; 297/243, DIG. 2, DIG. 9, 217

[56] References Cited

U.S. PATENT DOCUMENTS

| 2,436,991 | 3/1948 | Dirksen | 280/202 X |
| 3,625,405 | 12/1971 | Kezar | 280/202 X |
| 3,802,598 | 4/1974 | Burger et al. | 297/243 X |
| 4,050,615 | 9/1977 | Kline | 224/32 A |
| 4,053,091 | 10/1977 | Martelet | 224/32 A |

FOREIGN PATENT DOCUMENTS

| 11894 | 5/1920 | United Kingdom | 280/202 |
| 203126 | 9/1923 | United Kingdom | 280/202 |

OTHER PUBLICATIONS

Bulletin No. 108 by Camloc on Fasters: 20L Series Tension Latch.

Primary Examiner—Allan N. Shoap

[57] ABSTRACT

A two-piece combined child carrier and cargo container is provided for mounting upon a cycle having wheels. The unit includes a bifurcated open-topped container that is adapted to straddle a wheel of the cycle. The container has two downwardly extending side portions that are connected by an intermediate bridge portion. The unit also includes a top member that is movable between a first position in which it serves as a cover that overlies the container and a second inverted position in which the top member is partially inserted into the container and is adapted for use as an infant seat.

26 Claims, 7 Drawing Figures

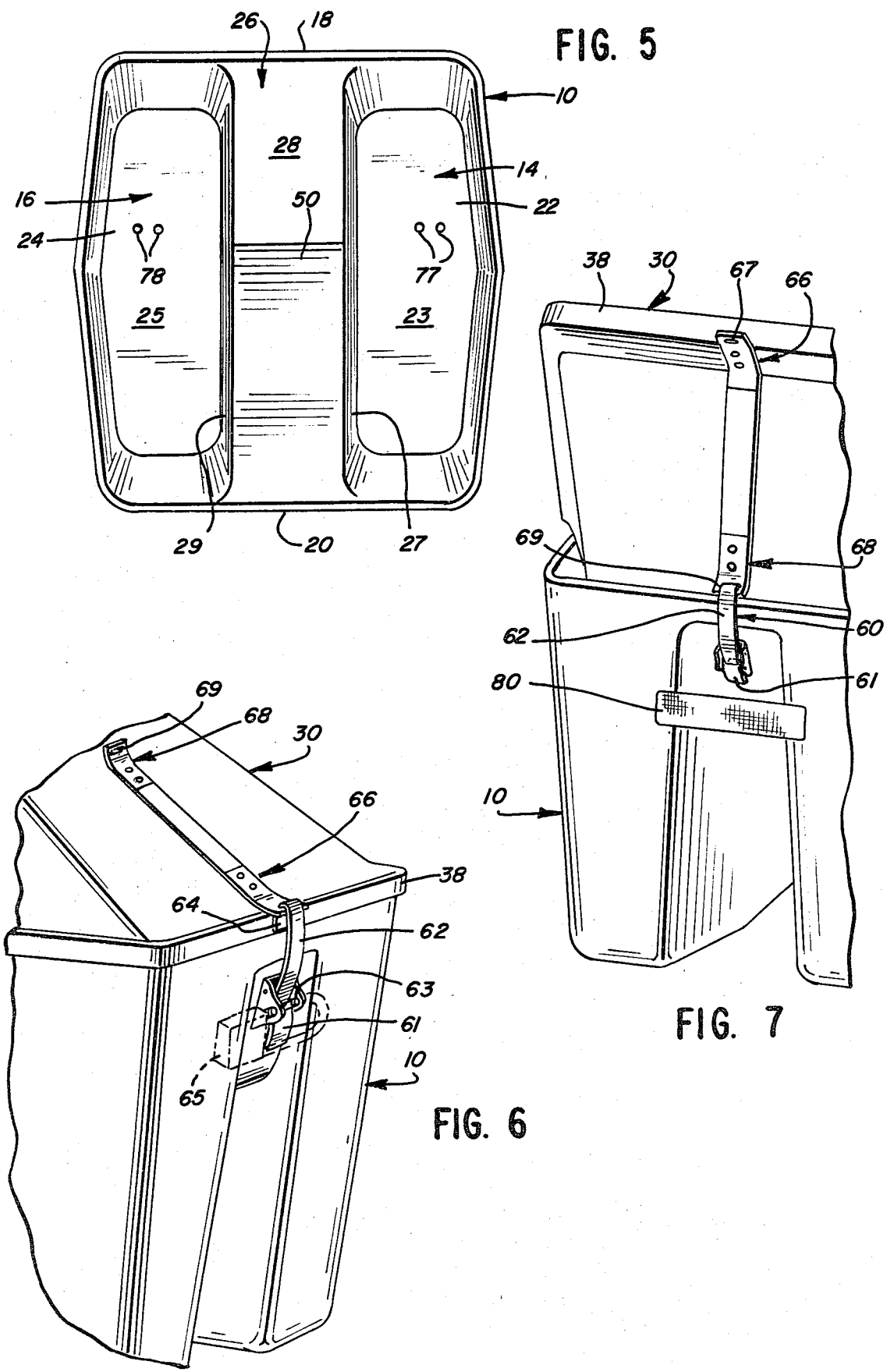

UNIT FOR CARRYING CARGO AND/OR CHILD

TECHNICAL FIELD OF THE INVENTION

This invention relates to carriers for attachment to a cycle for carrying cargo and/or a child.

BACKGROUND OF THE INVENTION

A variety of carriers are available for mounting to a cycle, such as a bicycle, moped or motorcycle. Many of these carriers are adapted to be mounted to the cycle behind the rear seat. The prior art devices can be viably used only as cargo carriers, or only as a child carrier.

Conventional containers that are mounted to bicycles for carrying cargo are not suitable for carrying a child. Even if they are large enough to hold a child, they are not adapted to comfortably and safely seat the child.

Similarly, prior art child carriers that are mounted on cycles are not adapted to carry cargo. The prior art child carriers are not provided with sides for containing a cargo, or a top member for covering the cargo.

Thus, there is a need for a combined unit that can be converted for use as a child carrier and/or cargo container, as desired.

SUMMARY OF THE INVENTION

The foregoing disadvantages of the prior art are overcome in accordance with the present invention in which a dual purpose unit is provided for carrying a child and/or cargo, as desired. The combined child carrier and cargo container is formed of two pieces, and is adapted to be mounted on a cycle, such as a bicycle, moped or motorcycle. The unit preferably is positioned about the rear wheel of the cycle.

The unit includes a bifurcated open-topped container that is adapted to straddle a wheel of the cycle. The container has a front end and a back end, and two downwardly extending portions that are connected by an intermediate bridge portion.

The unit includes a second, top member that has a forward end, an intermediate portion and a rearward end. The top member is movable between a first position in which it serves as a cover that overlies the container, and a second inverted position in which the top member is partially inserted within the container and serves as a seat for a child, with the child's feet positioned within the downwardly extending side portions of the container.

In the second position, the forward end of the top member is inserted into the container and the rearward end of the top member extends outside the container, with the intermediate portion of the top member overlying the back end of the container. The bridge portion of the container includes means for supporting the seat and holding the seat in a fixed position.

Male latch means can be secured to the back end of the container. The male latch means is releasably engageable with first female latch means on the rearward end of the top member for securing the top member to the container as a cover in the first position. The male latch means is releasably engagable with second female latch means on an intermediate portion of the top member for securing the seat to the container in the second, infant-carrying position.

In use, the unit is easily convertable between the first position in which it functions as a cargo carrier having a cover, and the second position in which the top member is partially inserted into the container so that the unit can be used as a child carrier, with some space also available for use in carrying cargo.

As a child carrier, the present invention has advantages over prior art devices in that the child's feet and legs are totally enclosed within the container to prevent them from exposure to the spokes on the rear wheel of the cycle, and to guard against exposure of the skin to scraping should the cycle inadvertently fall to the ground. Furthermore, a relatively greater proportion of the upper torso of the child is also disposed within the carrier to protect the child from accidents. In addition, the back portion of the seat extends relatively high to provide support to the child's back.

BRIEF DESCRIPTION OF THE DRAWINGS

Further features and advantages of the present invention will appear from the following description and drawings of a presently preferred embodiment, in which:

FIG. 5 is a plan view of the container;

FIG. 6 is a fragmentary rear perspective view of the unit in the first position; and FIG. 7 is a fragmentary rear perspective view of the unit in the second position.

DETAILED DESCRIPTION OF THE PREFERRED EMBODIMENT

Figure 1:
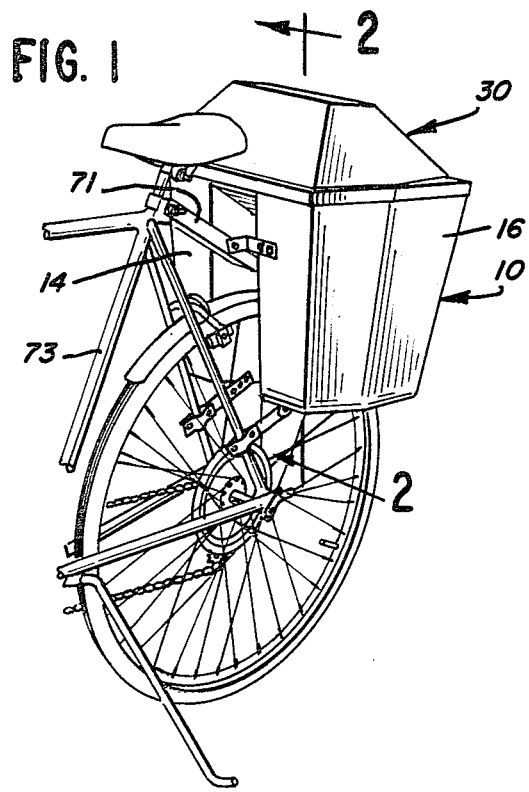
FIG. 1 is a perspective view of the combined child carrier and cargo container unit of the present invention in the first position in which the top member is used as a cover for the container.

While this invention is susceptible of embodiment in many different forms, there is shown in the drawings and will herein be described in detail a preferred embodiment of the invention, with the understanding that the present disclosure is to be considered as an exemplification of the principles of the invention and is not intended to limit the invention to the embodiment illustrated).

Figure 3:
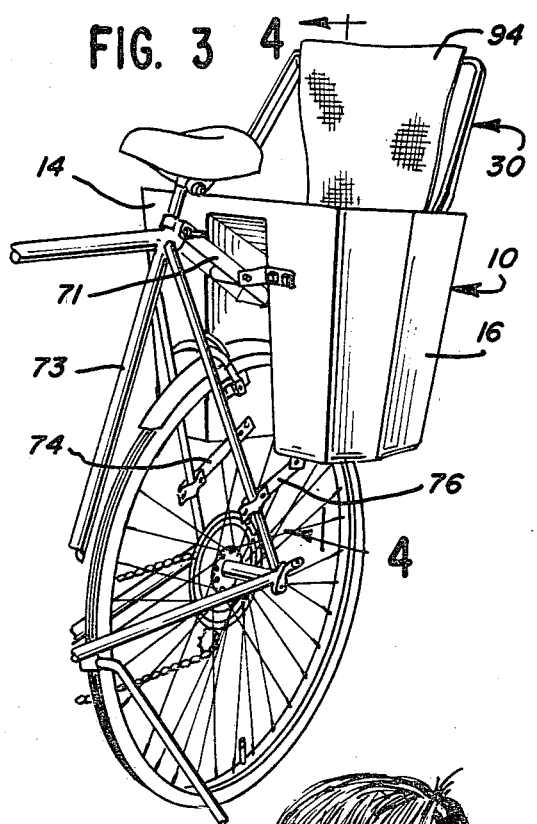
FIG. 3 is a perspective view of the unit in the second position in which the top member is used as an infant seat, showing the rear portion of a cycle to which the unit is mounted.

Referring to the drawings, FIGS. 1 and 3 show the two-piece combined infant carrier and cargo container unit of the present invention that is movable between the closed, cargo carrying position shown in FIG. 1, and the open, child carrying position illustrated in FIG. 3.

As shown in FIGS. 1 through 4, the unit includes a bottom container 10 and a top member 30. The container is generally in the shape of an inverted "U" (FIG. 3), and comprises a bifurcated open-topped container that is adapted to straddle the rear wheel 12 of a cycle.

The container has two downwardly extending side pockets 14 and 16, illustrated in FIG. 5, that are positionable on opposite sides of the rear wheel of the cycle. The side pockets extend for the length of the container, from the front end 18 to the back end 20, and have bottom walls 23 and 25, respectively. The side pockets 14 and 16 each have an outer side wall 22 and 24 that define the outer side walls of the container. The side walls 22 and 24 are tapered and bowed outwardly.

The container also includes an intermediate bridge portion 26 that connects the side pockets. The bridge 26 is adapted to be spaced above the rear wheel of the cycle, as shown in FIG. 3. The bridge 26 has a bottom surface 28 that is spaced below the upper rim of the container and above the bottom walls 23 and 25 of the side pockets. The bottom surface 28 extends from the front end to the back end of the container. The bridge 26 connects the side pockets 14 and 16 of the container, and is spaced from the outer side walls 22 and 24.

Referring again to FIG. 5, the side pockets 14 and 16 of the container have innermost side walls 27 and 29 that each extend downwardly from a longitudinal edge of the bridge 26 to the respective bottom walls 23 and 25 of the side pockets.

From the foregoing, it will be seen that side pocket 14 defines a receptacle having a bottom wall 23, and is bounded by upstanding walls 18 in the front, 22 on the outside, 20 on the back and 27 on the inside. Similarly, side pocket 16 defines a receptacle having a bottom wall 25 that is bounded by upstanding walls 18, 24, 20 and 29. Bridge 26 provides additional cargo space inasmuch as its bottom surface 28 is spaced below the upper rim of the container.

Figure 2:
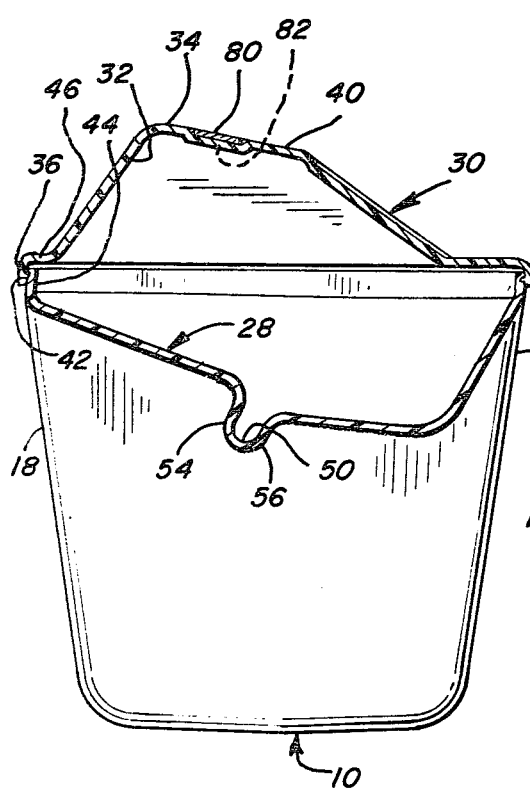
FIG. 2 is a cross-sectional view taken along line 2—2 in FIG. 1.

The other major component of the carrier is the top member 30, which is depicted in FIG. 2. The top member is generally concavo-convex, and has an inside surface 32 and an outside surface 34. The top member 30 extends from a forward end 36 to a rearward end 38, and has an intermediate portion 40.

The top is movable between two positions. In the first position, shown in FIGS. 1 and 2, the top member 30 serves as a cover for the container 10. In this position, the convex side of the top member is uppermost and the outside surface 34 is exposed. The top member has a lower peripheral portion 42 that surrounds the top member which is adapted to overlie and engage the upper marginal portion 44 of the container. The forward end of the top member overlies the front end 18 of the container, and the rearward end 38 of the top member overlies the back end 20 of the container.

The top member 30 is readily removable from the container 10, without the use of tools, and can be moved to its second position of use. This is accomplished by lifting the top member to separate it from the container, inverting the top member, and then partially inserting the top member into the container by moving it rearwardly in the container and pivoting the inverted top member about 45 degrees counterclockwise, to the position shown in FIGS. 3 and 4, in which the top member serves as a seat for a child.

In this position, the forward end 36 of the top member is supported by and engages the bottom surface 28 of the bridge of the container. The segment of the top member that is immediately adjacent to the forward end 36 functions as the seat portion of the top member, and the remainder of the intermediate portion 40 of the top member extending all of the way to the rearward end 38 serves as a back rest for the child. The child's feet are positioned within the downwardly extending side pockets 14 and 16.

Figure 4:
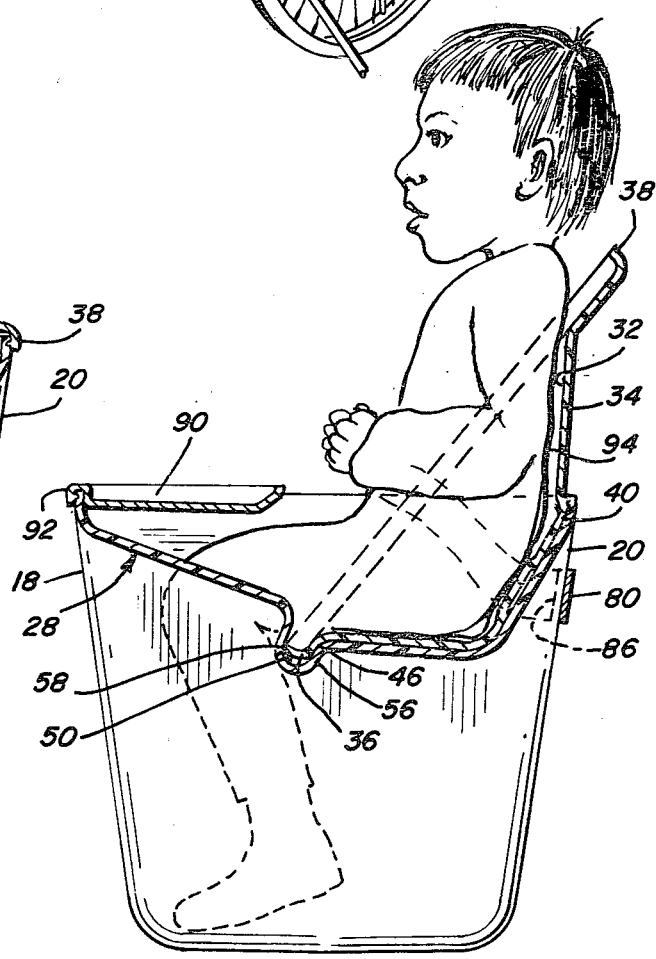
FIG. 4 is a cross-sectional view of the unit taken along line 4—4 in FIG. 3, also showing in phantom a child seat in the unit and a tray.

As depicted in FIG. 4, it is preferable to have the segment of the top member 30 that is disposed within the container 10 contoured so as to overlie and engage the bottom surface 28 of the bridge 26. In this position, the concave side of the top member is uppermost and the inside surface 32 is exposed and is contacted by the child.

Both the container and the top member are preferably of unitary molded plastic construction. They can be formed by a variety of processes, including rotational molding, blow molding, and injection molding. A preferred material for the container and the top member is high density polyethylene. Other materials that can be used include polypropylene, styrene, or other suitable plastics or other materials having relatively high impact resistance.

As shown in FIG. 2, the lower peripheral portion 42 of the top member is positioned outside the upper margin 44 of the container. As a result, the outside diameter of the top member is slightly greater than the outside diameter of the container. In order to insert the forward end 36 of the top member into the container to use the top member as a seat, the upper portion of the outer side walls 22 and 24 are resilient and flexible in order to expand the side walls laterally outwardly for receiving the seat. When the seat is removed, the side walls 22 and 24 will inherently return to the rest condition shown in FIGS. 1 and 5.

The container includes means for supporting and holding the seat in a fixed position. Referring to FIGS. 2, 4 and 5, the bottom surface 28 of the bridge defines a laterally extending groove or channel 50 which extends generally downwardly. The channel is generally U-shaped and has opposing legs 54 and 56.

The forward end 36 of the top member comprises a generally planar flange that is joined to the intermediate portion 40 by means of a curved segment 52. When the top member 30 is partially inserted within the container, the forward end 36 and the curved segment 46 of the top member are disposed within the channel 50. As shown in FIG. 4, the distal end 58 of the top member engages the leg 54 of the channel which prevents the top member from moving towards the front end 18 of the container. The outside surface of the curved segment 52 of the top member is in engagement with the upper end of leg 56 of the channel, thereby restraining the top member from moving toward the back end 20 of the container. As a result of the coaction of the channel 50 with the forward end 36 and curved segment 52 of the top member, the seat is held in a fixed position in the container. Engagement of the intermediate portion 40 of the top member with the back end 20 of the container also facilitates in limiting the movement of the top member.

Closure means is provided for maintaining the top member 30 releasably secured in position on the container 10. Referring to FIG. 7, a male latch member is secured to the back end 20 of the container near the upper rim of the container. The male latch member 60 includes a resilient hasp 62 that has a reversely bent end 64.

The top member 30 has two female latch members 66 and 68 that are spaced from one another. Female latch member 66 is secured to the top member adjacent to the rearward end 38 thereof, and defines an opening or eye 67. The bent end 64 of the hasp 62 is receivable through the eye 67 in the female latch 66 to releasably secure the top member to the container in the cargo carrying position illustrated in FIG. 6. Lever 61 is pushed downwardly to lock the latch in position. The lever 61 and hasp 62 comprise a conventional over-center tension latch structure wherein manipulation of lever 61 causes hasp 62 to move to lock or unlock the closure means, as desired. The latch is provided with openings 63 through which a lock 65 is receivable to prevent the latch from opening. By removing the lock and releasing the hasp, the bent end 64 is readily removable from the female latch 66 so that the top member 30 can be removed to provide access to the container, or to enable the top member to be inverted for use as a seat, as depicted in FIG. 7.

The unit is constructed to prevent the forward end 36 of the top member from separating the front end 18 of the container. This is accomplished by providing interlocking male and female members along the front end of the container and the forward end of the top member. For example, as shown in FIG. 2, an inwardly projecting, laterally extending tongue may be provided on forward end 36 of the top member. The tongue is adapted to mate with and be received in a corresponding groove in the outside surface of the front end 18 of the container. The tongue snaps in position into the groove as the top member is pushed downwardly onto the container, and can be disengaged from the groove when desired with an upwardly directed force.

Male latch 60 is also used to secure the top member in position when it is used as a seat. The female latch member 68 that is secured to an intermediate portion of the top member also defines an opening or eye 69. When the top member 30 is inverted and partially inserted into the container, as shown in FIG. 7, the hasp 62 is received through the eye 69 to releasably secure the top member 30 to the container when the lever is pushed into the locking position.

According to another feature of the invention, brackets are provided for mounting the container to the rear end of the cycle. Referring to FIG. 3, a first bracket 71 has one end secured to the front end 18 of the container, and an opposite end that is secured to the bicycle frame, such as the bicycle seat post 73, by conventional means such as a threaded screw and nut. Additional brackets 74 and 76 each have one end secured to the bottom walls 23 and 25 of the container, as by conventional fastening means received through openings 77 and 78 in the bottom wall of the container. The brackets 74 and 76 also have an opposite end that is secured to the bicycle frame with conventional fastening means.

In accordance with a further feature of this invention, the securement of brackets 71, 74 and 76 to the container can be releasable, as by using conventional thumb screws. This enables a user of the bicycle to use the unit at locations remote from the cycle. For example, the unit can be used on the cycle to transport cargo and/or an infant to a desired location, and the unit can thereafter be removed from the cycle to be used as a picnic cooler, or as a chair for a child.

The unit also includes strap means for use as a safety feature in strapping the infant to the unit, or for securing articles to the top member of the unit. A strap 80 is receivable through a pair of spaced apart openings 82 defined by the intermediate portion 40 of the top member 30. When the top member 30 is used as a cover for the container, an article such as a towel can be positioned against the inside surface 32 of the intermediate portion 40 of the top member, with the strap 80 holding the article in place. The ends of the strap are provided with a buckle or other locking means for securing together the ends of the strap.

Referring to FIGS. 4 and 7, the back wall of the container defines a pair of spaced-apart apertures 86. The apertures are positioned and arranged such that they are in alignment with the openings 82 when the top member is partially inserted into the container and used as a seat. As illustrated in FIG. 4, the strap 80 is threaded through the apertures 86 in the container, extends through the openings 82 in the seat, and can be secured about the waist of an infant seated in the top member.

A tray may also be provided for use when the unit is used as a child seat. Referring to FIG. 4, tray 90 extends laterally between the side walls 22 and 24, and extends from the front wall 18 to a location spaced from the back wall 20. The top surface of the tray is about even with the upper rim of the container.

The tray is releasably secured to the container by means of downwardly turned edges 92 that are adapted to overlie the upper end of the front wall 18 of the container and the upper end of the side walls 22 and 24.

The tray facilitates in confining the child within the seat in an upright position. It is particularly useful for feeding the child, since food or beverages can be conveniently placed thereon.

The invention has other advantages in that a reflective material can be applied to the outside surface of the back end of the container for safety purposes to make the cycle more visible, particularly when used at night. Also, an insulating material such as styrofoam can be provided along the inside surface of the bottom and sides of the container to improve the insulating characteristics of the container for use as a cooler. Furthermore, a cushion 94 (FIGS. 3 and 4) may be provided along the inside surface 32 of the top member 30 so that the top member can be used comfortably as an infant seat. The cushion covers the hard edges of the relatively rigid top member to protect the child.

From the foregoing, it will be observed that numerous variations and modifications may be effected without departing from the true spirit and scope of the novel concept of the invention. It is to be understood that no limitation with respect to the specific structure illustrated herein is intended or should be inferred. It is, of course, intended to cover by the appended claims all such modifications that fall within the scope of the claims.

What is claimed is:

1. A two-piece combined child carrier and cargo container for mounting upon a cycle having wheels, comprising:
    an open-topped container having two downwardly extending side portions positionable on opposite sides of one of the cycle wheels, and an intermediate bridge portion connecting said side portions and disposed above said cycle wheel,
    and a top member which is movable between a first position in which said top member serves as a cover for said container, and a second inverted position in which said top member is partially inserted within said container and is supported by said intermediate portion of said container, said top member in said second position serving as a seat for a child with the child's feet positioned within said downwardly extending side portions of said container,
    said container including means for holding said seat in a fixed position.

2. A combined carrier and container as defined in claim 1 wherein said holding means comprises laterally extending channel means defined by said bridge portion, said top member having one end which is receivable in said channel means, thereby to restrain said seat from moving longitudinally relative to said container.

3. A combined carrier and container as defined in claim 1 wherein said container has a resiliently laterally flexible upper margin and expands laterally to receive said seat.

4. A combined carrier and container as defined in claim 1 in which said top member is concavo-convex with the convex side uppermost as a cover and the concave side uppermost as a seat.

5. A combined carrier and container as defined in claim 1 in which each of said container and said top member is of unitary molded plastic construction.

6. A combined carrier and container as defined in claim 1 wherein means is provided for releasably mounting said container to said cycle.

7. A combined carrier and container as defined in claim 1 wherein tray means is releasably secured to said container when said top member is in said second position.

8. A combined child carrier and cargo container for mounting upon a cycle having wheels, comprising:
an open-topped container having a front end and a back end, a pair of downwardly extending side portions positioned on opposite sides of one of the cycle wheels, and a bridge portion disposed between and connecting said side portions and positioned above said cycle wheel,
a top member having a front end and a back end, said top member being movable between a first position in which said top member serves as a cover that overlies said container, and a second inverted position in which said front end of said top member is inserted into said container and said back end of said top member extends outside said container, said top member in said second position serving as a seat for a child with the child's feet positioned within said downwardly extending side portions of said container.

9. A combined carrier and container as defined in claim 8 wherein said top member includes an intermediate portion between said front end and said back end, said intermediate portion overlying said back end of said container when said cover means is in said second position.

10. A combined carrier and container as defined in claim 9 in which said container has a resiliently laterally flexible upper margin and expands laterally to receive said seat.

11. A combined carrier and container as defined in claim 9 in which said bridge portion includes means for supporting said seat and holding said seat in fixed position.

12. A combined carrier and container as defined in claim 9 in which said top member is concavo-convex with the convex side uppermost as a cover and the concave side uppermost as a seat.

13. A combined carrier and container as defined in claim 9 in which each of said container and said top member is of unitary molded plastic construction.

14. A combined carrier and container as defined in claim 9 wherein means is provided for releasably mounting said container to said cycle.

15. A combined carrier and container as defined in claim 9 wherein tray means is releasably secured to said container when said top member is in said second position.

16. A combined child carrier and cargo container for mounting upon a cycle, comprising:
a bifurcated open-topped container having a front end and a back end, and two downwardly extending portions connected by an intermediate bridge portion, said container being adapted to straddle a wheel of said cycle,
male latch means secured to said back end of said container,
a top member having a front end, an intermediate portion, and a back end,
first female latch means secured to said back end of said top member,
second female latch means secured to said intermediate portion of said top member,
said top member being movable between a first position in which said top member serves as a cover that overlies said container with said male latch means releasably engageable with said first female latch means to secure said top member to said container, and a second inverted position in which said top member is partially inserted within said container and said male latch means is releasable engageable with said second female latch means to secure said top member to said container in said second position, said top member in said second position serving as a seat for a child with the child's feet positioned within said downwardly extending side portions of said container.

17. A combined carrier and container as defined in claim 16 wherein in said second position said front end of said top member is inserted into said container and said back end of said top member extends outside said container.

18. A combined carrier and container as defined in claim 16 in which said container has a resiliently laterally flexible upper margin and expands laterally to receive said seat.

19. A combined carrier and container as defined in claim 16 in which said bridge portion includes means for supporting said seat and holding said seat in fixed position.

20. A combined carrier and container as defined in claim 16 in which said top member is concavo-convex with the convex side uppermost as a cover and the concave side uppermost as a seat.

21. A combined carrier and container as defined in claim 16 in which each of said container and said top member is of unitary molded plastic construction.

22. A combined carrier and container as defined in claim 16 wherein said front end of said container is provided with female securement means, and said front end of said top member is provided with male securement means, said male securement means being engageable with said female securement means to further secure said top member to said container in said first position.

23. A combined carrier and container as defined in claim 16 wherein means is provided for releasably mounting said container to said cycle.

24. A combined carrier and container as defined in claim 16 wherein tray means is releasably secured to said container when said top member is in said second position.

25. A two-piece combined child carrier and cargo container for mounting upon a cycle having wheels, comprising:

an open-topped container having two downwardly extending side portions positionable on opposite sides of one of the cycle wheels, and an intermediate bridge portion connecting said side portions and disposed above said cycle-wheel, and a top member which is movable between a first position in which said top member serves as a cover for said container, and a second inverted position in which said top member is partially inserted within said container and is supported by said intermediate portion of said container, said top member in said second position serving as a seat for a child with the child's feet positioned within said downwardly extending side portions of said container, and means for releasably mounting said container to said cycle.

26. A combined child carrier and cargo container for mounting upon a cycle having wheels, comprising:

an open-topped container having a front end and a back end, a pair of downwardly extending side portions positioned on opposite sides of one of the cycle wheels, and a bridge portion disposed between and connecting said side portions and positioned above said cycle wheel, a top member having a front end and a back end, said top member being movable between a first position in which said top member serves as a cover that overlies said container, and a second position in which said front end of said top member is inserted into said container, said top member in said second position serving as a seat for a child with the child's feet positioned within said downwardly extending side portions of said container.

* * * * *